Nov. 17, 1953 R. L. JAESCHKE 2,659,832
SPEED CONTROL SYSTEM FOR ELECTROMAGNETIC COUPLING
Filed March 26, 1951 2 Sheets-Sheet 1

Ralph L. Jaeschke
Inventor
Koenig and Pope
Attorneys

Patented Nov. 17, 1953

2,659,832

UNITED STATES PATENT OFFICE 2,659,832

SPEED CONTROL SYSTEM FOR ELECTROMAGNETIC COUPLING

Ralph L. Jaeschke, Kenosha, Wis., assignor to Dynamatic Corporation, Kenosha, Wis., a corporation of Delaware Application March 26, 1951, Serial No. 217,604

9 Claims. (Cl. 310—95)

1

This invention relates to speed control systems, and more particularly, to such control systems incorporating a speed-responsive pilot generator.

Pilot generators are frequently used in speed-responsive control systems to provide a voltage proportional to the speed of the controlled apparatus. The control system of this invention is adapted to provide speed-responsive and reference voltages for control purposes, while at the same time eliminating undesired voltage variations resulting from such causes as resistance heating, line voltage variations and hysteresis effects. Moreover, the invention avoids the use of permanent magnets and high-grade magnetic iron in the generator.

Briefly, the control system of this invention comprises a control circuit having a speed-responsive voltage source in series opposition with a reference voltage source. The speed-responsive voltage is obtained from a generator having a field coil which is connected in the circuit supplying the reference voltage. As a result, changes in the reference voltage are counteracted by compensating changes in the speed-responsive voltage. Such undesired variations in the reference voltage might result from heating of resistances and line voltage variations. Hysteresis effects of the generator iron are counteracted by causing the generator field excitation to pulsate, but at a frequency sufficiently high to avoid pulsating effects in the control action. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of the various possible embodiments of the invention are illustrated, Fig. 1 is a circuit diagram illustrating one embodiment of the control system of this invention;

Figure 1:
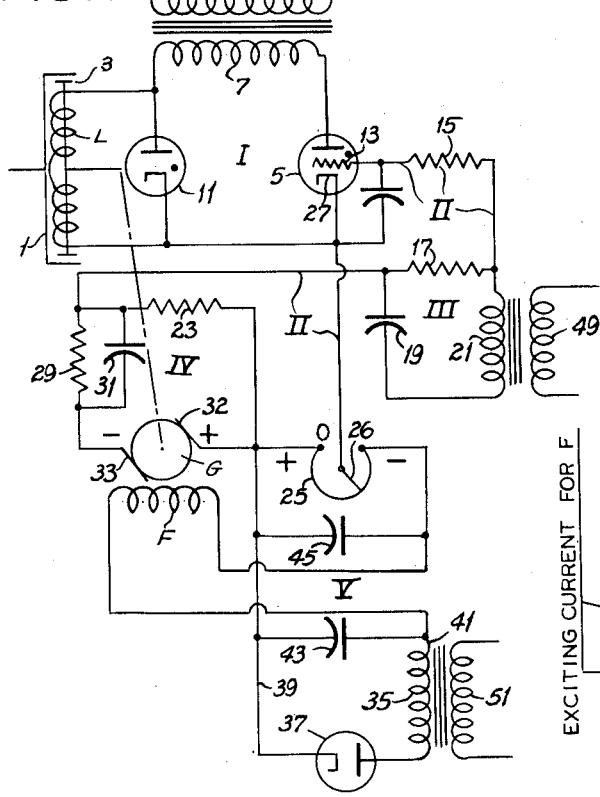
Figure 6:
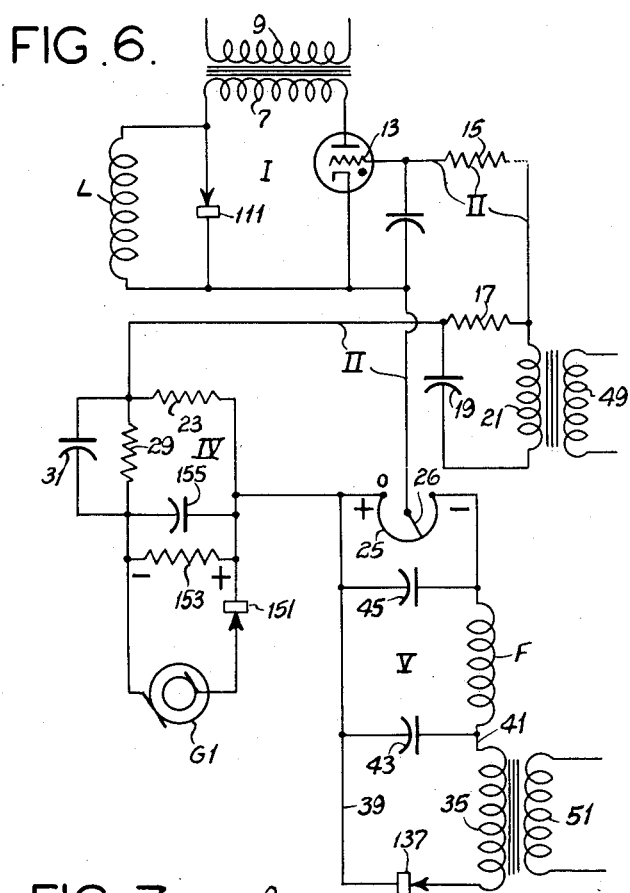
Figure 7:
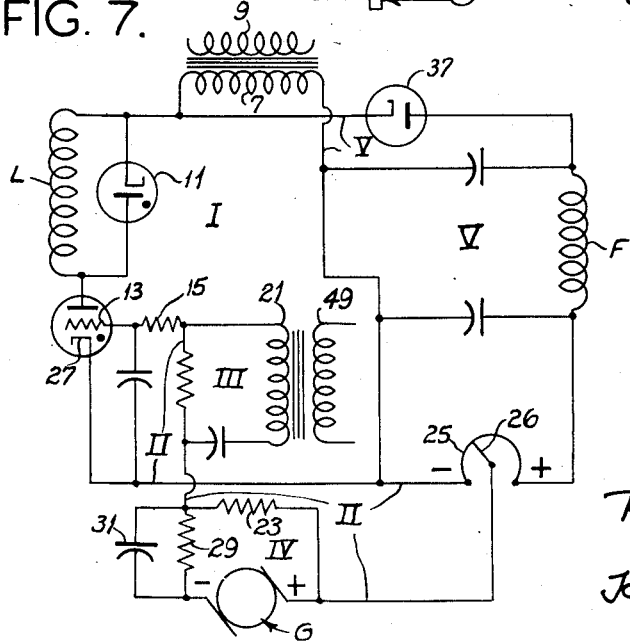

2 in the response of the control of this invention;

Fig. 6 is a circuit diagram similar to Fig. 1, illustrating an alternative embodiment of the invention; and, Fig. 7 is a circuit diagram similar to Fig. 1, illustrating another embodiment of this invention.

Similar reference characters indicate corresponding parts throughout the several views of the drawings.

In Fig. 1, there is shown a control circuit particularly adapted for speed control of an eddy-current slip coupling. The slip coupling is also diagrammatically shown in Fig. 1 to comprise a driving inductor member 1, a driven field member 3 and a field coil L, the excitation of which is variably controlled by the circuit of Fig. 1. Eddy-current slip couplings are known in the art, being shown, for example, in U. S. Patent 2,465,982. The slip of such a coupling for a given load varies with the excitation of its field coil; hence the speed of the driven member 3 may be regulated by means of a control adapted to cause the excitation of the field coil L to be increased or decreased in accordance with changes in the speed of the driven member 3. A pilot generator is employed to detect speed changes and initiate a correction of slip at the coupling. Control circuits employing this general principle are shown, for example, in United States Patents Nos. 2,277,284 and 2,353,107.

In Fig. 1 of the drawings, there is shown a main power control circuit I comprising the field coil L, a gas-filled grid-controlled vacuum tube 5 and a transformer secondary 7. The primary 9 of the transformer is connected to conventional 60-cycle power supply lines. A hot-cathode rectifier tube 11 is connected across the field coil L, as shown, to provide a smoothing effect upon the D. C. current pulsations through the field coil L. The arrangement is such that control tube 5 conducts on positive half cycles of voltage applied to its plate, and the back rectifier 11 passes the inductive discharge of the inductive field coil when tube 5 is not conducting. Control of the coupling is had by varying the firing time of tube 5 relative to the variation in time of its plate voltage. The particular type of grid-control signal disclosed herein to illustrate this invention is a fixed out-of-phase A. C. rider on a variable D. C. bias.

The grid circuit II includes an A. C. rider source III, a speed-responsive D. C. voltage source IV and a D. C. reference voltage source V arranged to oppose the speed-responsive voltage source IV.

A control grid 13 of tube 5 is connected through a grid-current limiting resistor 15 to a resistor 17. A phase-shifting capacitor 19 and transformer secondary 21 are connected across the resistor 17 to provide an A. C. signal in fixed out-of-phase relation with the A. C. voltage applied to the plate of the control tube 5. For example, the A.C. rider may lag the plate voltage 90 degrees. Series connected with the resistor 17 are a resistor 23 and a potentiometer 25, an adjusting arm 26 of the latter being connected to a cathode 27 of the control tube to complete the grid circuit. A speed-responsive voltage is impressed across the resistor 23 by a separately excited D. C. generator G mechanically coupled to the driven member 3 of the slip coupling. The generator output is connected in series with an anti-hunt network including a resistor 29 and a parallel-connected capacitor 31. The arrangement is such that a positive commutator brush 32 is connected at the junction of resistors 23 and 25, with a negative brush 33 connected through the anti-hunt network to the junction of resistors 23 and 17.

A comparatively constant D. C. potential is impressed across the potentiometer 25, the adjusting arm 26 being adapted to vary the effect of this potential on the grid bias. This adjustable reference or speed-setting potential is supplied by the circuit V. Circuit V includes a comparatively stable power supply source in the form of a transformer secondary 35, the A. C. voltage of which is rectified by a hot-cathode vacuum-tube rectifier 37 and impressed across conductors 39 and 41, the arrangement being such that conductor 39 is positive with respect to conductor 41. The positive conductor 39 leads to the junction of resistor 23 and potentiometer 25. The other conductor 41 is connected to one terminal of a separately excited field coil F for the generator G. The other terminal of the field coil F is connected to the other side of potentiometer 25. A capacitor 45 is connected across the potentiometer 25 and a capacitor 43 is connected across the rectifier 37 and transformer secondary 35. It will be understood that primaries 9, 49 and 51 for the transformer secondaries 7, 21 and 35, respectively, are connected to the same 60-cycle power supply lines. Also, suitable heating filaments (not shown) would be provided for tubes 5, 11 and 37.

It is important to note the location of the generator field coil F in the reference-voltage circuit V, and the series connection of the coil F with the speed-setting potentiometer 25 and the voltage supply sources 35, 37 and 43. The arrangement results in compensation against certain undesired variations in the generator output, as will be explained.

Figure 2:
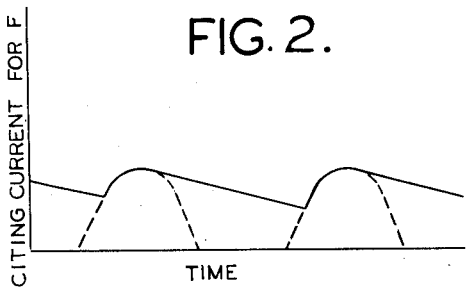
Fig. 2 is a current-wave diagram illustrating the nature of the generator field excitation.

In addition, the field coil F functions as a filtering choke for reducing the ripple content of the D. C. voltage across the potentiometer 25. It is apparent that the elements 43, 45 and F function as a capacitor-input filter. Although the filtering effect on the voltage applied across the potentiometer 25 is substantial, it is important that the current through the field coil should pulsate as indicated in Fig. 2. The purpose of a pulsating excitation for the field coil F is one of substantially counteracting hysteresis effects of the generator iron. The frequency of pulsation should be kept relatively low, in order that the pulsations are not lost in the filtering action of the field coil. Yet the frequency of pulsation should not be so low as to result in a pulsation at the controlled apparatus 3. The half-wave rectification system provides a 30-cycle pulse which is suitable for this purpose.

The pulsating effect in the exciting current is accentuated by decreasing the capacitance of the capacitor 43. Capacitor 45 is primarily adapted to reduce the ripple factor in the voltage across the potentiometer 25, although it also has some effect upon the pulsating quality of the exciting current for field coil F. Capacitor 45 should be larger than capacitor 43, but not so large as to follow the transient voltage changes appearing across the A. C. power supply. For example, capacitor 43 may be 2 mfd. and capacitor 45 may be 20 mfd.

Operation is as follows:

With the driven member 3 of the coupling running at a predetermined speed (less than the speed of the driving member 1), the generator G impresses a proportionate predetermined voltage across the resistor 23. This speed-responsive voltage tends to drive the grid signal in a negative direction, or retard the firing time and decrease conduction of the tube 5. The potentiometer 25 is adjusted to provide a positive component for the grid biasing, which opposes the negative bias component of the generator and tends to advance the firing time and thereby increase conductions of tube 5. If the torque of the prime mover for the driving member 1 of the coupling and the load torque on the driven member 3 of the coupling are stable, then the driven member and the generator G coupled thereto will be run at a constant speed with constant slip in the coupling as determined by the stable excitation of the field coil L. The grid bias of tube 5, as determined by the speed of the generator and the setting of the potentiometer 25, is such that the condition of tube 5 is sufficient to provide this excitation.

If the speed of the driven member 3 transiently decreases, the generator output also decreases, thereby causing the grid bias to move in a positive direction. The anti-hunt network of 29 and 31 temporarily accentuates the voltage change. The firing angle of the tube 5 is advanced, with a consequent increase in the excitation of field coil L, which in turn results in a reduction of the slip at the coupling and an increase in the speed of the driven member 3. The speed of the driven member returns toward its original value, hence the control functions as a speed-regulating system or governor. To summarize, the output of the generator follows the speed of the driven member 3 and thereby controls the tube 5 in such manner as to correct for changes in speed by varying the excitation of the coupling and the slip in the coupling.

If the control is to function properly, the net D. C. grid bias should fluctuate solely as a function of speed after the adjusting arm 26 has been set. It is the purpose of this invention to provide such a response, and this from a generator having a field coil (as contrasted with a permanent-magnet type of generator). More particularly, this control system is adapted to permit the use of inexpensive poor-quality generators, and the system is adapted to obtain the reference voltage from conventional power lines perhaps having substantial line voltage variations.

It will be noted that variations in the line voltage are translated by the transformer secondary 35 into variations in the reference voltage across the potentiometer 25; however, such variations in the reference voltage are herein counteracted by proportionate changes in the output of the generator and the voltage across the resistor 23. This is accomplished by causing the line voltage variations appearing at the transformer secondary 35 to affect the flux from the generator field coil F so as to increase or decrease the output of the generator an amount such that the variation at 23 cancels the variation appearing at the potentiometer 25. The voltage output of the generator varies directly with its field flux as well as with its speed. Therefore, the voltage output of the generator will increase when the excitation of the coil F is increased, as upon an increase in the voltage across transformer secondary 35.

The corrective action can best be explained with reference to Fig. 3, wherein a curve S is a plot of the generator output (voltage) as a function of the field excitation (current) for a given speed. Because of the voltage drop across resistor 29, the actual speed-responsive voltage across resistor 23 will be something less than the generator output, for example, as indicated by curve SV. The lines RV1, RV2, and RV3 are plots of the reference voltage as a function of the current through the reference voltage circuit. Different lines are shown for different settings of the potentiometer, which results in different values of net bias. The net bias may be substantially zero as indicated by line RV1, or it may be positive as indicated by RV2, or it may be negative as indicated by RV3. It may be noted that the field-exciting current for the generator is the same as the current through the potentiometer, and this current will fluctuate around a constant mean value $I_1$ depending upon the voltage across the transformer secondary and the resistances in the circuit V.

Figure 3:
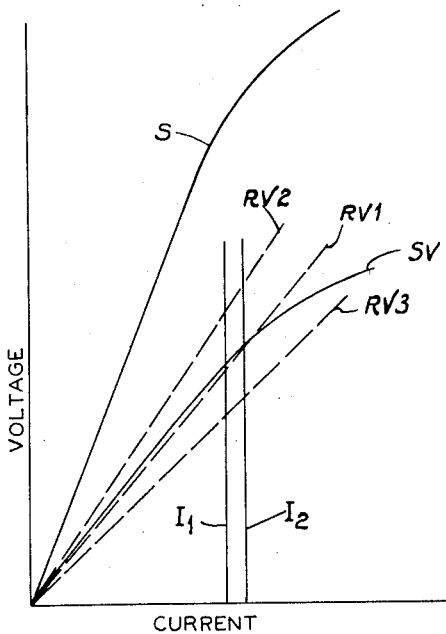
Fig. 3 is a diagram illustrating certain corrective actions of this system.

Fig. 3 shows that for different settings of the potentiometer, the slopes of RV1, RV2 and RV3 are substantially equal to the slope of SV for the value of current $I_1$. Thus, if the current $I_1$ should increase to a value of $I_2$, there will be proportionate changes in the speed-responsive voltage at resistor 23 and in the reference voltage at potentiometer 25, which will substantially counteract one another, so that there is an insignificant change in the net grid bias. Although the curves S and SV will be changed with differences in the generator speed, it will be understood that the compensating action remains substantially effective. This compensation occurs upon any change in the current in circuit V, hence there is compensation for resistance changes resulting from potentiometer heating and field coil heating, as well as for line voltage variations.

Figure 4:
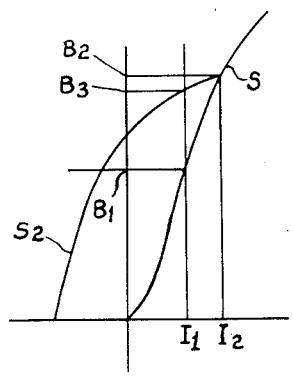
Fig. 4 is a diagrammatic representation of the magnetization characteristic of the iron in the generator, and a representation of certain hysteresis effects upon the response characteristics of controls.

Although the above relation may hold for high quality pilot generators, low quality generators have large hysteresis losses in the magnetic iron of the generator. The hysteresis effect has an adverse effect upon the response of the control, particularly where there is a transient increase in the line voltage and then a return to the original value of line voltage. Referring to Fig. 4, a field excitation corresponding to $I_1$ would produce a flux $B_1$ (and proportionate generator output voltage) as determined by the saturation or magnetization curve S. If the field excitation were to increase to a value $I_2$ then the field flux and generator output would also increase to a value corresponding to $B_2$. However, upon return of the current to the original value $I_1$, the flux would follow the curve $S_2$ and hence would remain substantially above the original value, for example, as indicated at $B_3$. This failure of the field flux and generator output to return to the original value $B_1$ corresponding to the current $I_1$ has an adverse effect upon the control response characteristics of controls incorporating generators.

Figure 5:
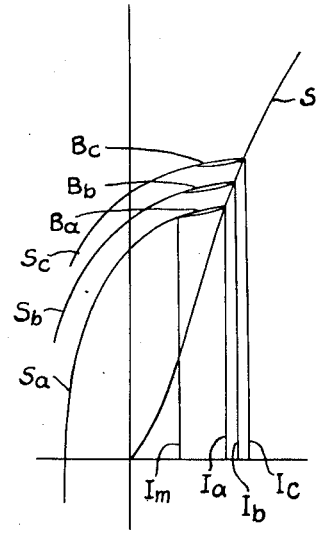
Fig. 5 is a diagram similar to Fig. 4 showing how this invention eliminates hysteresis effects

In order to counteract the hysteresis effect, a pulsation is introduced into the field excitation, as mentioned heretofore. Referring to Fig. 5, the effect of this pulsating field excitation current, indicated as occurring between the value $I_m$ and a peak value $I_a$, is one of introducing a small narrow loop $B_a$ depending upon a magnetization characteristic $S_a$. The loop is substantially flat so that there is a nominal effect upon the generator flux. Then, when a change or increase in the line voltage variation occurs, the field excitation may be thought of as increasing in increments such as $I_b$ and $I_c$, for which there is a complete loop $B_b$ and $B_c$. When the exciting current drops back to its original value, the flux also is decreased incrementally so that the flux returns to its original value for peak current $I_a$, instead of following the saturation curve $S_c$. In other words, the pulsating nature of the generator field excitation causes the field flux to follow the mean saturation curve S on decreases as well as upon increases in the field excitation current.

Fig. 1 illustrates a control system employing a D. C. generator and hot-cathode vacuum-tube rectifiers. As shown in Fig. 6, an A. C. type of generator G1 having slip rings instead of a commutator may be employed in place of a D. C. generator, provided a rectifier element 151 is used to rectify the output of the A. C. generator. The rectified output is ripple filtered by a resistor 153 and capacitor 155 before being applied to an anti-hunt network and resistor 23. Fig. 6 also illustrates the use of selenium rectifiers 111, 137, and 151 in place of the hot-cathode vacuum-tube rectifiers. Otherwise the circuit of Fig. 6 is identical to the circuit of Fig. 1.

The circuit of Fig. 7 is essentially the same as that of Fig. 1, except the power source for the reference voltage is obtained across the main transformer secondary 7, thereby eliminating the transformer secondary 35 and transformer primary 51. Heretofore, it has not been practical to use the main transformer as a power source for obtaining the reference voltage, because of the variations in the transformer voltage resulting from variations in the clutch excitation. This system, being adapted to counteract such voltage variations, permits the main transformer to be used as a power supply source for the reference voltage.

Figs. 6 and 7 are illustrative of the many variations possible with the control system of this invention. It will be understood that the controlled apparatus may take other forms, and that this invention has application in any control having a speed-responsive generator.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. In a speed control system for dynamoelectric apparatus, a control circuit comprising a D. C. speed-responsive voltage source and a D. C. reference voltage source connected in series opposition, the speed-responsive voltage source comprising a separately excited generator having a D. C. field coil and output connections to said control circuit; the reference voltage source comprising a resistance connected to said control circuit, said field coil being connected in series with said resistance, and a rectifier element and an A. C. power supply connected in series with one another to form a half-wave rectifier and across the series combination of the resistance and field coil.

2. A speed control system as set forth in claim 1, further comprising a capacitor connected across said resistance for ripple filtering the D. C. voltage appearing across said resistance.

3. A control system as set forth in claim 2, further comprising a capacitor connected across the half-wave rectifier and A. C. power supply, said capacitor being smaller than the capacitor connected across the resistance.

4. In a speed control system, a gas-filled grid-controlled tube, a grid circuit for said tube comprising an A. C. rider source, a D. C. speed-responsive voltage source and a reference voltage source in series opposition with said D. C. speed-responsive voltage source, said speed-responsive voltage source comprising a separately excited generator having a D. C. field coil, said reference voltage source comprising a potentiometer and a circuit connected across said potentiometer comprising in series said field coil, a half-wave rectifier and an A. C. power supply source, and a capacitor connected across said potentiometer.

5. A speed control system for rotary dynamo-electric apparatus having a driven member of certain inertia, a main magnetic field coil for said member of predetermined inductance, the mechanical speed of which driven member is controlled by varying the excitation of said field coil; the control system comprising a control circuit responsive to a main control signal and connected to said field coil for variably exciting it, a separately excited D. C. generator driven by the driven member to supply a speed-responsive control signal to said control circuit, said generator having a field coil of predetermined inductance, a D. C. power supply which may vary and which is connected to excite the field coil of said generator, said supply including means producing a pulsating effect which is independent of any varying voltage of the D. C. supply and of a frequency value sufficiently low to pass through the predetermined inductive filtering action of the generator field coil, whereby corresponding pulsations occur in the output control signal of the generator and in the control circuit, but the frequency value of said pulsations being sufficiently high that a corresponding frequency of pulsating speed response will not occur in the driven member due to the inductance of said main field coil and said inertia of the driven member.

6. A speed control system as set forth in claim 5, further including a resistor connected in series with the field coil of the generator and with said D. C. supply, said resistor further being connected to said control means to supply a reference voltage in series opposition with the speed-responsive signal supplied by said generator.

7. A speed control system as set forth in claim 6, further comprising a capacitor connected across said resistor for ripple filtering the pulsating output of said D. C. supply.

8. A control as set forth in claim 7, further comprising a second capacitor connected across the series combination of the field coil and the resistor, said capacitor being smaller than said first capacitor.

9. In a speed control system, a gas-filled grid-controlled tube, a grid circuit for said tube comprising an A. C. rider source, a D. C. speed-responsive voltage source and a reference voltage source connected in series opposition with said D. C. speed-responsive voltage source, said speed-responsive voltage source comprising a separately excited generator having a D. C. field coil, said reference voltage source comprising a potentiometer and a circuit connected across said potentiometer comprising in series said field coil, a rectifier unit and an A. C. power supply source, and a capacitor connected across said potentiometer.

RALPH L. JAESCHKE.

References Cited in the file of this patent

UNITED STATES PATENTS

| Number | Name | Date |
| --- | --- | --- |
| 1,807,190 | Bock et al. | May 26, 1931 |
| 2,031,509 | Seeley | Feb. 18, 1936 |
| 2,285,195 | Edwards | June 2, 1942 |
| 2,334,179 | Edwards et al. | Nov. 16, 1943 |
| 2,389,367 | King | Nov. 20, 1945 |
| 2,430,310 | Stratton | Nov. 4, 1947 |
| 2,504,878 | Reilly | Apr. 18, 1950 |
| 2,524,222 | Garde | Oct. 3, 1950 |